United States Patent [19]
Ashby

[11] 4,024,531
[45] May 17, 1977

[54] DISPLAY DEVICES

[75] Inventor: Rodney Roberts Rayner Ashby, Bournemouth, England

[73] Assignee: National Research Development Corporation, London, England

[22] Filed: Mar. 3, 1975

[21] Appl. No.: 554,826

[30] Foreign Application Priority Data

Mar. 5, 1974  United Kingdom ............. 9942/74

[52] U.S. Cl. ........................... 340/334; 340/324 M
[51] Int. Cl.² ........................................... G08B 5/36
[58] Field of Search ............ 340/334, 339, 324 AD, 340/336, 337, 324 M

[56] References Cited
UNITED STATES PATENTS

| | | | |
|---|---|---|---|
| 3,493,956 | 2/1970 | Andrews et al. | 340/334 |
| 3,573,790 | 4/1971 | Schulenburg et al. | 340/334 |
| 3,685,039 | 8/1972 | Flanagan | 340/324 AD |
| 3,747,073 | 7/1973 | Sharpless | 340/324 M |
| 3,750,138 | 7/1973 | Burgan et al. | 340/334 |
| 3,913,089 | 10/1975 | Albrecht | 340/336 |

OTHER PUBLICATIONS

Newell et al., An Alphanumeric Display as a Communication Aid for the Dumb, *Medical and Biological Engineering*, Jan. 1975, pp. 84–88.

*Primary Examiner*—David L. Trafton
*Attorney, Agent, or Firm*—Pollock, VandeSande & Priddy

[57] ABSTRACT

A display device using a scanned dot-matrix array produces a running display by shifting the displayed characters by one column at each scan of the array. The characters are fetched from store sequentially and are decoded into dot-matrix form. The dot columns corresponding to each character are then shown sequentially as the display is scanned. The process is repeated at the next scan with a one-column displacement of the characters. In one embodiment the characters are stored in a recycling shift register and the required displacement is achieved by means of a counter incremented at each scan of the array. In another embodiment the characters are stored in a random-access memory and the sequencing and displacement are achieved by means of a preprogrammed micro-computer.

2 Claims, 3 Drawing Figures

DISPLAY DEVICES

The present invention relates to display devices and in particular to the electrical circuits for controlling the operation of such devices.

Practical display devices employing arrays of light emitting diodes capable of displaying symbols such as numbers or letters have been in use for many years. Display panels comprising a large number of light emitting diodes in a rectangular array and capable of simultaneously displaying many symbols in a dot matrix form are commercially available. A typical dot matrix for displaying a selected single symbol consists of an array of 35 light emitting diodes arranged in a 7 × 5 array.

More recently gas discharge displays have become available which can also display symbols in dot matrix form. Basically these displays comprise an array of cavities, in cavity block behind a glass cover, in each of which a glow discharge can be established. The flow discharge is transferred down the device by signals applied to a series of cathodes. The discharge can be transferred to the cavities which are at the front of the device by suitably addressing anodes associated with the cavities at appropriate times in the travel or scan of the glow discharge. An example of this type of display device is the Burroughs self-scan panel display. (Self-scan is a trade mark of Burroughs Corporation).

Associated with any of the above dot matrix devices are decoding circuits and symbol generation circuits. Information to be displayed is normally presented to the display in binary coded form. The decoding circuit decodes the binary coded symbol signals and gives a signal at an output associated only with the particular symbol desired. The decoding circuit has an output line for every symbol it is capable of decoding. The symbol generation circuit determines which of the light emitting diodes or glow cavities in the array of the display are to be activated to form the particular symbol presented to it by the decoding circuit. The symbol generation circuit has inputs to which signals in a unique binary code must be applied for each symbol it is desired to generate. The circuit has a number of output lines several of which will be activated in parallel to energize the required light emitting diodes or cavities. More detailed information on certain types of display devices, decoding circuits and symbol generation circuits may be found in the literature, for example in Injection Electroluminescent Devices by C H Cooch, published by John Wiley & Sons 1973.

Symbol generation circuits associated with display panels of the type described above often have column selection inputs. Each of these inputs when energized causes the symbol generation circuit to activate output lines to energize light emitting diodes or cavities in a vertical column of the panel. Each column selection input is associated with a particular vertical column of any symbol to be generated. For example on input might be associated with the left hand column, another input with the right hand column and other intermediate inputs with other columns between the left hand and right hand columns. The number of inputs will depend on the particular dot matrix form chosen to represent the symbols. For example in a 7 × 5 dot matrix form there are five columns per symbol and thus five column selection inputs on the character generation circuit. If signals are applied to the column selection inputs in sequence and in synchronism with scanning signals applied to the display to sequentially enable vertical columns of the display a complete symbol will be generated and displayed. Further, if after every complete column selection input sequence the symbol signal from the decoding circuit is changed a series of different symbols can be displayed on the panel. The total number of symbols that can be displayed at any time depends on the dot matrix chosen to represent a symbol, the chosen number of columns of space between symbols and the number of vertical columns of light emitting diodes or cavities on the display panel.

Clearly, because only one column of diodes or cavities is illuminated at any one time the scan rate must be sufficiently fast that any flickering in the display as observed by the eye should not be unduly distracting.

The display of characters and symbols in this way is limited in application because the symbols displayed are fixed in relation to each other and their number is limited by the extent of the display panel. It is an object of the present invention to provide an electroluminescent display apparatus which can provide a moving display of longer sequences of symbols.

According to the present invention a display device includes a regular array of light sources, a symbol generator circuit for storing and producing appropriate sets of signals for displaying specified dot columns forming part of selected symbols, having outputs connected to the light sources and having column selection inputs and symbol selection inputs for controlling the selection of the sets of signals produced; a scan control circuit connected to scan the light sources by sequentially priming the columns of light sources by periodic signals; a first counter circuit connected to count in synchronism with the operations of the scan control circuit and to apply count signals to the column selection inputs of the symbol generation circuit; and a second counter circuit having an input connected to receive an incrementing signal from the scan control circuit at the end of each scan of the light sources and having outputs connected to reset the first counter to the count currently held in the second counter circuit at the beginning of each scan of the light sources.

An embodiment of the invention will now be described by way of example only and with reference to the accompanying drawings of which:

Figure 1:
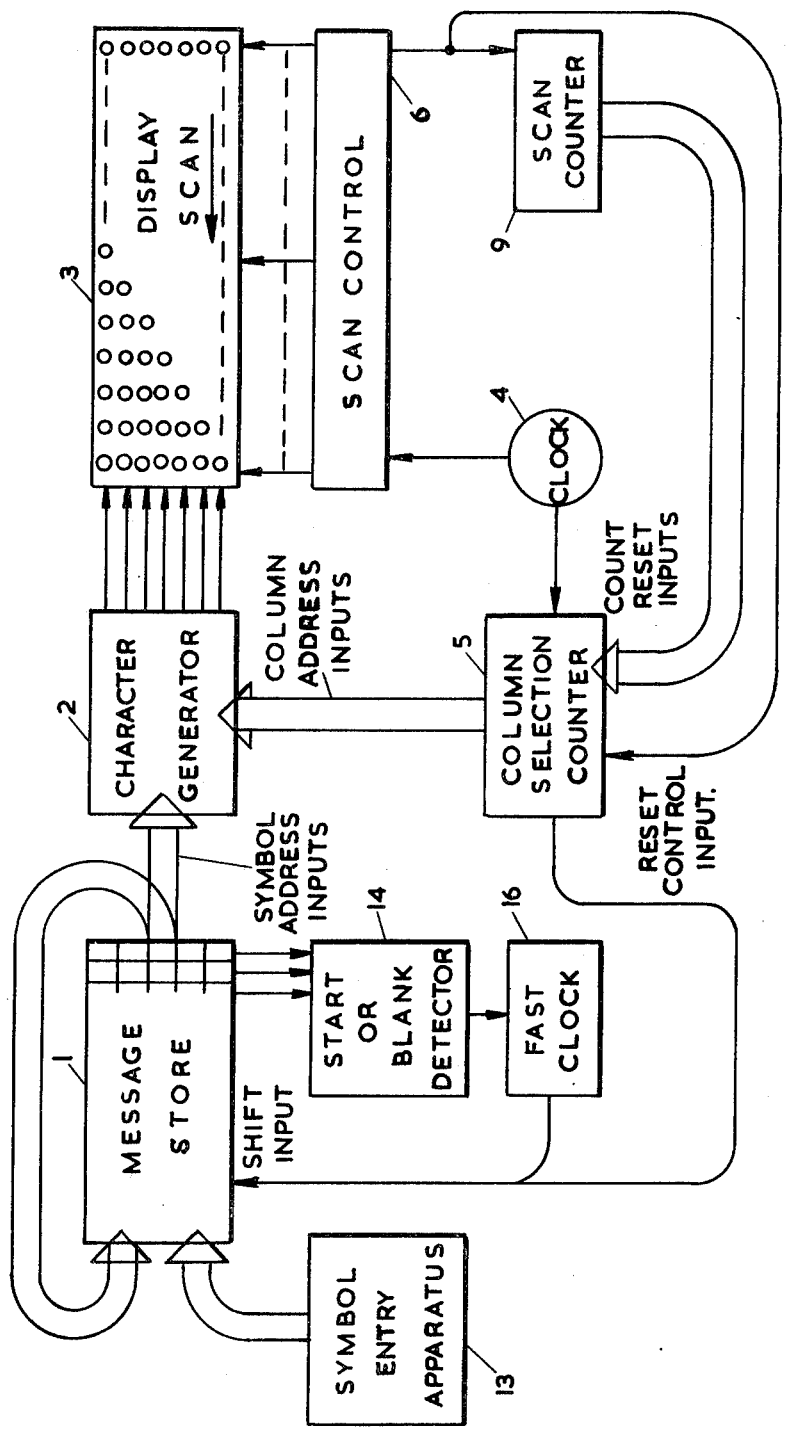
FIG. 1 is a block schematic diagram of a moving character display apparatus.

In FIG. 1, the main components of the moving character display apparatus are a message store 1, a character generator 2, and a character display 3. For clarity, where interconnections between the various components comprise a plurality of similar conductors a single broad conductor is shown in the drawings.

The character display 3 comprises an array of electroluminous devices capable of displaying symbols in a dot matrix form. The array consists of $n$ columns and $m$ rows of electroluminous devices which may be selectively illuminated to represent symbols, each symbol being in a $p$ by $m$ dot matrix form, where $n$ is considerably greater than $p$ so that the display is capable of showing a large number (approximately $n \div p$) of symbols simultaneously. In the drawing column one is on the extreme right of the display and the columns are numbered in sequence from right to left, column $n$ being at the extreme left of the display. In a typical system each symbol is formed by a matrix of 35 light sources where $p = 5$ and $m = 7$. The display could be for example of the Burroughs Self-Scan Panel Display Type (Self-Scan is a trade mark of the Burroughs Corporation). In that display the panel consists of 112 columns (ie $n = 0$ 112) with each column containing 7 gas discharge glow cavities. The panel can thus display 18 symbols in a 5 × 7 dot matrix with one column of dots between one character and the next. The symbols displayed can be letters or numerals or other mathematical or code symbols which can be satisfactorily represented by a 5 × 7 dot matrix.

The purpose of the character generator 2 is to determine which of the electroluminous devices in the character display 3 are to be illuminated at any given time to form a required symbol. The character generator 2 is a memory circuit comprising for example a pre-wired diode matrix, having $q$ inputs from the message store 1, $m$ parallel outputs and $p$ column selection inputs. Each of the $m$ parallel outputs is connected to every electroluminous device in one row of the character disply 3. For example, the first output of the character generator 2 is connected to all of the electroluminescent devices in the top row of the display, the second output of the character generator 2 is connected to all the electroluminescent devices in the second row of the display and so on. Signals applied in parallel to each of the $q$ parallel inputs from the message store 1 represent symbols in a binary coded form. Each symbol is uniquely represented by a unique set of such binary boded signals. The character generator 2 is responsive to the $q$ parallel inputs such that when a signal is simultaneously applied to one of the $p$ column selection inputs the $m$ outputs will comprise the signals required to illuminate appropriate ones of the electroluminescent devices in one column of the display 3 to represent a corresponding column of the desired symbol.

A clock pulse generator 4 is connected to the count inputs of a column selection counter 5 and a scan control circuit 6. In normal operation, the column selection counter 5 is arranged to count down in sequence from $p$ to zero returning to $p$ and the count after zero and repeating this sequence continuously. Each zero count generates a pulse which is applied to a shift input of the message store 1, and the counts from $p$ to 1 generate signals which are applied to corresponding column selection inputs of the character generator 2. The scan control 6 is arranged to apply enabling signals to all the electroluminous devices in the display 3 in a column by column scan sequence.

In FIG. 1 the direction of scan is, as indicated by the arrow on the display 3, from right to left ie from column one to column $n$.

The message store 1 is a multistage shift register in which each stage can contain a code of $q$ bits representing any selected symbol. The first pulse from the clock pulse generator 4 sets the column selection counter 5 to the count $p$. This count is applied to the character generator 2 as a column $p$ selection signal. Column $p$ corresponds to the right-hand column of the dot matrix form of the character currently represented by the output of the last stage of the message store 1.

Signals representing this column are therefore fed from the $m$ outputs of the character generator 2 to all the light sources in corresponding rows of the display 3. However, because the scan control 6 initially enables only the first column of the electroluminous devices in the display 3 the right-hand column of the first character is therefore reproduced only in column one of the display 3. The second pulse of the clock pulse generator 4 sets the column selection counter 5 to the count $p-1$ state. This state is decoded by the decode circuit and the second column of the display 3 is fed with the signals representing the dot matrix form of the column adjacent to the right-hand column of the character held in the character generator 2 to the next column of the display as primed by the scan control 6. As the pulses continue from the clock pulse generator 4 each column of the character in the last stage of the message store 1 is displayed in its correct relative position on the display 3, until the first column is selected and displayed in column $p$ of the display 3. When the next pulse from the clock pulse generator 4 is received by the column selection counter 5 it reaches the count zero state and sends a signal to the shift input of the message store 1 so that the character in the second stage of the message store 1 is presented to the character generator 2 while the first character is fed back to the input of the message store 1. At the same time the scan control 6 enables the $p + 1$th column of the display 3 but, because there is no character column selector input to the character generator 2 this remains unilluminated and represents a space. The operation continues until all the characters in the message store 1 have been displayed on the display 3. The scan control 6 will then enable the last column ie column $n$ of the display 3. The next pulse from the clock pulse generator 4 will reset the scan control 6 and set the column selection counter 5 to zero. The first character of the sequence of characters stored in the message store 1 will then, as will be explained later, again be presented to the character generator 2. Because the scan control 6 scans the display from right to left and the characters are constructed column by column from right to left it will be appreciated that the message store 1 must apply symbols to the display in the reverse order to that which they are read ie left to right. This is achieved, as will be described more fully hereinafter, by symbol entry apparatus 13 which enters each new symbol at the front of a sequence of symbols circulating in the message store 1.

It will now be appreciated that in this configuration the display 3 will show all the characters held in the message store 1 in their correct sequence and providing the frequency of the clock pulse generator 4 is sufficiently high the effect to the eye will be that of a stationary display of these characters on the display 3.

To give the effect of a moving display of characters the circuit has the following further components. A scan counter 9 is connected to count end-of-scan signals from the scan control 6, modulo $p$; that is to say it counts in sequence from zero to $p$ and then on the next count is reset to zero again. input of the column selection counter 5. Whenever an end-of-scan of the display 3 is detected, the signals from the control 6 and the counter 9 will set the column selection counter 5 to match the current state of the counter 9. The actions by which these extra components produce a moving display will now be described.

The scan counter 9 will initially be set to zero. The first scan of the display 3 will then proceed as described herein above with respect to the stationary operation. The characters held in the message store 1 will thus be displayed in their correct positions on the display 3. However when the scan control 6 enables the last column of the display 3, it will also increment the scan counter 9 thereby setting it to count one, and will also energize the reset control input of the column selection counter 5 so that it too will be set to one before the next scan begins. Thus the column selection counter 5 will start to count down from one instead of from zero. The effect of this is that the first, left hand column of the newest character in the message store 1 will be displayed in column one of the display 3. All columns of the remaining characters are correctly positioned relative to the first column of this character in the display 3 but the scan will reach the left hand side of the display 3 before the left hand side of the first character has been shown. The overall effect is that the display has shifted to the left by one column; one column is omitted at the left hand side and a new column added at the right hand side. At the end of the second scan the scan counter 9 will be incremented to count two and the column selection counter 5 will then commence to count down from count two so that the characters are again displaced to the left by one further column. As the process continues the effect is that after rate is sufficiently high the movement as seen by the eye appears continuous with flickering.

It will be appreciated however that in this simple system described where characters appear at the right hand side of the display 3 as others disappear from the left hand side the impression given is one of a continuous loop of information being displayed by the display 3. To give the effect of continuously updated by moving characters displaced on the display 3 the following further components may be used. Symbol entry apparatus 13 which may be for example an electric typewriter is connected via suitable coding and addressing logic to the input of the message store 1. A start or blank detector 14 which may be for example an OR-gate is connected to the 1st stage of the message store 1.

In operation data from the symbol entry apparatus 13 in the form of a sequence of symbols is stored in sequential addresses in the message store 1.

At any time therefore a block of data will be circulating through the message store 1 and each character in coded form is presented to the character generator 2 for display in turn. The detector 14 detects when the beginning of the data block reaches the end of the message store 1, by sensing when one or more of the locations in the last stage of the store 1 first contain data, and energizes the symbol entry apparatus 13 to insert the next symbol in the first stage of the store 1. In this way the newest symbol in the store 1 will always be presented to the character generator 2 first, followed by the other symbols in an increasing age sequence. The display 3 will then read correctly from left to right. When all the stages of the message store 1 except one are full as each character of the data representing it is displaed it is fed back to the input of the message store 1 but the oldest character at any time will be overwritten and replaced by new data representing a new character supplied by the symbol entry apparatus 13. In this way as the displaying continues the characters appears at the right hand side of the display 3 and leave the left-hand side of the display 3 but do not reappear as new characters are being formed instead.

Many embodiments and alternatives will now suggest themselves to one skilled in the art. For example, in order to stop and examine more closely a sequence of symbols, feedback connections can be set up on the message store 1 so that when desired it continuously recirculates the selected sequence and displays it in a stationary position on the display 3. At the same time the symbol entry apparatus may continue to fill up other addresses of the store 1 so that data acquisition is not interrupted.

In another example the start or blank detector circuit 14 is connected to a fast clock pulse generator 16. The fast clock 16 is connected via suitable switching circuits to the shift input of the message store 1. In operation the detector 14 is responsive to the frist blank occurring in the last stage of the store 1, by sensing when all the locations of that stage are simulatneously empty, and then operates to connect the shift input of the shift registe 1 to the fast clock 16. The fast clock 16 produces clock pulses at a rate far greater than the clock pulse generator 4 and the message store data is circulated rapidly until the beginning of the block of data is again detected by the detector 14 which then stops the fast clock. In this way the presentation of characters to the character generator 2 can always be synchronized with the scanning operations of the display 3 no matter how long the message store 1 or the number of characters that it holds, and, moreover the average brightness of the display 3 is kept at a higher level by reducing its switched-off time corresponding to blank information being presented to the character generator 2.

In other examples logic circuitry can be devised to enable mistakes generated at the data source to be corrected in the message store 1, or to make the display show the data running backwards to the beginning of the message store 1 in order to find some point in the data worth examining.

It will also be appreciated by those skilled in the art that the message store 1, the character generator 2, and the circuits for storing characters in binary coded form in given locations of the message store 1, presenting them in sequence to the character generator 2 and selecting column-by-column the characters in the character generator 2 in synchronism with the scanning action of the display, need not be discrete circuits but may form part of a computer program for a microcomputer having a central processor and associated memories. Central Processor Units (CPUs) which are very small, typically comprising a single integrated circuit, are readily available and are finding an increasing number of applications. One CPU might typically contain a plurality of data registers, an accumulator, one or more temporary registers, a parallel binary arithmetic unit capable of addition, subtraction and logical operations, and a memory containing a program counter and words used internally to store program and sub-routine addressed. Clearly since the operation of the invention involves a series of repetitive steps some of which are of a minor mathematical nature, for example counting, addition and subtraction, a CPU may be used in embodiments of the invention with considerable advantage.

Figure 2:
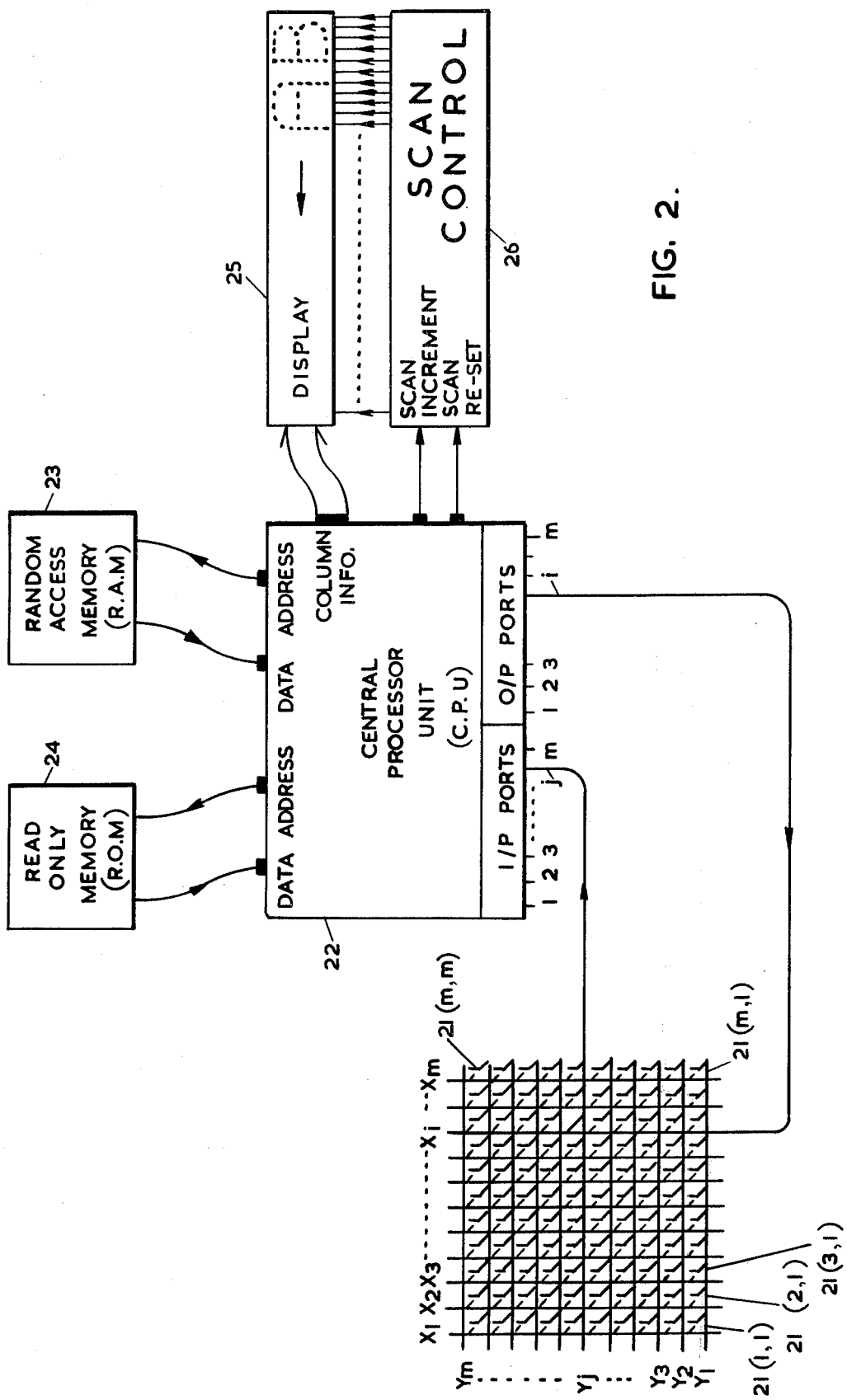
FIG. 2 is a block schematic diagram of another form of moving character display apparatus.
Figure 3:
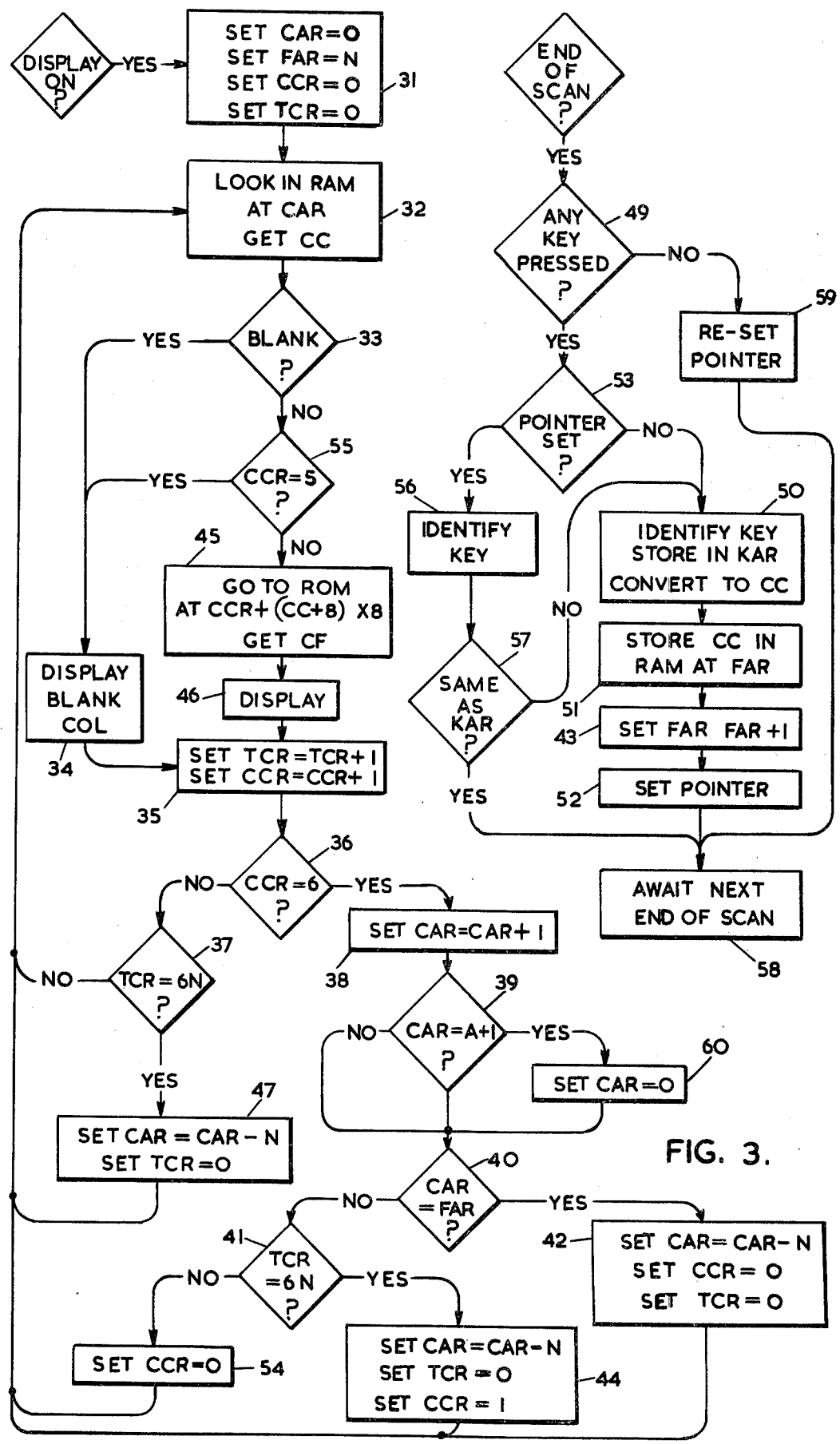
FIG. 3 is a flow chart.

One such embodiment will now be described briefly by a way of example only and with reference to the accompanying drawings of which:

FIG. 2 is a block schematic diagram of a control circuit of a moving character display, and FIG. 3 is a flow diagram of a program used by a CPU part of the circuit of FIG. 2.

In FIG. 2 a key board 31 includes a plurality of normally open switches 21 (1,1), 21 (2,1), 21 (3,1) ... 21 ($m,m$) each associated with one of a corresponding set of $m^2$ keys (not shown) arranged in an $m \times m$ matrix. Each switch represents one of $m^2$ characters selectable by depressing the associated key and is connected between one of m conductors $x_1, x_2, x_3 \ldots x_m$ and one of m conductors $y_1, y_2, y_3 \ldots y_m$ disposed perpendicularly to each other. If the key switch 21 (1,1) is closed by depressing its key the conductors $x_1$ and $y_1$ are connected together. If the switch 21 (2,1) is closed the conductors $x_2$ and $y_1$ are connected together. In general, if the switch 21 (i, j) is closed $x_i$ and $y_j$ are connected together. The conductors $x_1 x_2 x_3 \ldots x_m$ are connected to a set of m output ports and the conductors $y_1 y_2 y_3 \ldots y_m$ are connected to a set of m input ports of a CPU 22.

CPU 22 is programmed to energized each of its output ports in turn until a signal is received back at one of its input ports. The state of the input and output ports at that time then uniquely identify the key currently depressed and hence the character required. The CPU 22 is connected to transfer information to and receive information from a random access memory (RAM) 23 having A memory locations and a read only memory (ROM) 24 having B memory locations, where A is usually much greater than B. The RAM 23 is used to store in an intermediate binary code form characters in the sequence that they are selected by the key board 21. It function is much the same as the message store 1 in FIG. 1 except that the information it contains is not circulated. The ROM 24 contains the program instruction words by which the operations of the CPU 22 are controlled in C memory locations where C<B and has a large number of uniquely addressed memory locations D = B–C in each of which the column dot format of a character is stored. In a 7 × 5 dot matrix apparatus the whole dot matrix form of each character is held in five adjacent column memory locations so that once the address of the first column is specified the addresses of the remaining columns may be obtained by incrementing the address of the previous column by one, four times. The ROM 24 is preferably a programmable read only memory (PROM) ie an integrated circuit which may have its contents erased by ultra-violet light and new program instructions and/or character formats written therein with the aid of a device, which is well known, reading punched tape and storing column-by-column the information on the tape in successive locations of the PROM The CPU 22 has seven row outputs connected to a display 25 which in this case is similar to the display 3 of FIG. 1 and a scan incrementing output and a scan-end input connected to a scan control circuit 26 which is similar to the scan control circuit 6 of FIG. 1.

The operation of the circuit of FIG. 2 will now be described with reference to the flow diagram shown in FIG. 3 which represents a typical set of program instructions stored in the ROM 24. It will be understood that the CPU 22 will demand program instructions in sequence; in some cases the next instruction being dependent on the result of complying with the last.

In the following description of the operation of the apparatus, each step in the flow chart of FIG. 3 will be identified at appropriate points by its reference number in brackets.

The CPU22 has a number of registers which at any given time indicate the following:

A flag address register (FAR) containing a number in the range O to A indicating the character address (CA) in the RAM23 into which the next keyed character code (CC) should be placed; a total column register (TCR) containing a number in the range O to 6N, where N is the total number of characters, each with an associated space column, that the display 25 is capable of displaying at one time, indicating the column of the display under consideration; a character column register (CCR) containing a number in the range 0–5 representing the column of the 5 column in the dot Matrix representation of a character and its following space column which is under consideration; a character address register (CAR) containing a number in the range O to A indicating the RAM address under consideration; and a key address register (KAR) which stores the states of the I/P and O/P ports of the CPU 22 corresponding to a new key 21 depression.

Assume first of all that none of the keys 21 have been depressed and so no characters have been placed in the RAM 23. When the display is first switched on the FAR will be set to N and the TCR, CCR and CAR to zero (31). The CPU 22 is instructed to examine the contents of the RAM address specified by the CAR contents (32) ie in this case RAM address zero. It decides whether the address contains a character or whether it is empty (33). Since there are no characters in the RAM at present the contents of the address zero is a blank and so the CPU 22 is instructed to display a column of blanks, ie no cavities illuminated (34). The CPU 22 then sets the TCR = TCR + 1 and the CCR = CCR + 1 (35). At this point the scan control is also commanded to move to the next column in the display. The contents of the TCR and the CCR will both now be equal to 1. The CPU 22 is then instructed to examine the contents of the CCR to see if it has reached 6 (36) which it has not and therefore the CPU 22 is next instructed to examine the contents of the TCR to see if its has reached a count of 6 N indicating the end of the display has been reached (37) and again it has not. As a result of these examinations being answered in the negative the CPU 22 then returns to look at the same address in the RAM (32) and goes through the same procedure once more.

After six scans and six blank column displays the contents of the CCR will be set equal to 6 (35). When the CPU examines the contents of the CCR (36) it will find that it has reached 6 and it will then set the CAR to equal CAR +1 (38). The CPU then examines the contents of the CAR to see if it has reached a count of A +1 where A, it will be remembered, is the total number of characters that the RAM is capable of storing (38). Since the contents of the CAR at this stage has only been set to 1 this will be answered in the negative and the CPU 22 then examines the contents of the CAR to see if it has reached the count equal to the FAR (40). Again because at this stage the CAR is only equal to 1 this will be answered in the negative and the contents of the TCR will now be examined (41) similar to the examination in (37) to see if the end of the display has been reached. At this stage the contents of the TCR is equal to 6 and therefore the end of the display has not been reached so the CPU is instructed to look at the address in the RAM specified by the contents of the CAR as incremented by the operation in (38) ie to examine the RAM address 1. The CCR is also set = 0 (54).

The process continues and since no characters are contained in the RAM every successive address in the RAM specified by the CAR is found to contain a blank. Eventually the end of the display is reached and it will be found by the CPU that the contents of the CAR as incremented once more by the operation in (38) is now equal to the contents of the FAR ie N (40). The CPU 22 then knows that there are no characters in the RAM so it merely sets the contents of the CAR = CAR −N, the contents of the CCR to zero, and the contents of the TCR to zero (42). So the whole process is repeated, the display showing nothing whatsoever on each scan. At the end of each scan the CPU 22 is programmed to follow a sub-routine to see if any of the keys 21 have been depressed. This will be described in detail later.

Let it be assumed that at the end of a certain scan after the process has begun one character is keyed into the RAM 23. The effect of this as will be described later with reference to the method by which characters are placed in the RAM, is to set the FAR = FAR +1 i.e. in this case to N +1 (43). The next scan will then also show a complete blank but when the CPU finally examines the contents of the CAR to see if it has reached a count equal to FAR (40) because the FAR has incremented by 1 (43) the answer will be no and yet the examination of the TCR in (41) will show that the end of the display has been reached. In this case the contents of the CAR are set to CAR−N and the contents of the TCR to zero but this time the contents of the CCR are set equal to 1 (44). During the next scan therefore the contents of the RAM address zero is considered first again but only five instead of six blank columns are put on the display to correspond to it because the contents of the CCR reached 6 one cycle earlier (36). The effect is in fact the same as moving all the blanks one column to the left on the display. In this way the contents of the RAM address N −1 will be fully examined one column before the end of the display has been reached. At this point the contents of the CCR will be found to be 6 (36) and when the CAR is set equal to CAR +1 ie equal to N (38) it will not be found equal to the contents of the FAR but neither will the end of the display have been reached (41). The CPU will then for the first time examine the contents of the RAM address specified by the CAR i.e. N (32) and will find that it is not a blank (33). The CCR will then be equal to zero so that the CPU 22 is instructed to go to the ROM address specified by (CC +8) × 8 to get the display format of the first column of the character stored in the RAM address N (45). This is then displayed in the last column of the display (46). The CPU 22 will then find that the end of the display has been reached when it find that the contents of the TCR is equal to 6N (37). It sets the contents of the CAR = to CAR −N and set the contents of the TCR equal to 0 (47). The contents of the RAM address zero will again be examined in (32) but it will be noted that the contents of the CCR is now equal to 1 as set by (35) the effect of which is to move the display one more column to the left so that on the next cycle two columns of the characters held in the RAM address N will be displayed.

The process continues until all the columns of the character in the address N have been displayed ie on each successive scan a new column of the character is displayed so that it appears to enter the display from the right hand side and move across the display from right to left. When the CCR = 5 the CPU 22 automatically inserts a space column behind the character during the next scan (55). When all of the character and its space are displayed however the contents of the CCR will once again be equal to 6 (36) and it will now be found after incrementing the contents of the CAR by 1 (38) ie the contents of the CAR = N +1 that the contents of the CAR are equal to the contents of the FAR (40), provided no more characters have been keyed into the RAM meanwhile. The CPU then sets the contents of the CAR to CAR −N and sets the contents of the CCR to zero and the contents of the TCR to zero. In this way each successive scan of the display (25) thereafter will show the character in a fixed position at the right hand side of the display.

As each new character is keyed into the RAM addresses the contents of the FAR are incremented by one (43) so that characters will move on the display face so long as new characters are being inserted. When the inputting of new characters is stopped the movement of the characters will stop with the last character inputed at the far right hand side of the display (25). Although the display (25) is only capable of displaying N characters it is possible to store in the RAM 23 more characters than N and therefore only the last N characters in the RAM 23 will be permanently displayed. However, a simple switch (not shown) is provided to reset the CAR to zero. The complete contents of the RAM 23 will then move across the display (25) face once more stopping with the last N characters permanently so that all the information can be examined by an operator. Should more characters be keyed into the RAM 23 than there are memory locations ie when FAR is set equal to FAR +1 (43) i is found to equal A +1 (48). The contents of the FAR are set equal to zero which it will be remembered is an address in the RAM 23 which previously contained a blank. When the FAR is incremented further by new characters eventually the RAM address N will be reached again and then the very first character of the complete message will be overwritten and lost. It will be appreciated that in the situation where the whole of the contents of the RAM 23 are used up with characters it will be necessary to determine this at operations (42) and (44) and to set the contents of the CAR to an appropriate figure. For the sake of simplicity this is not shown in the flow diagram of FIG. 3.

New characters can be keyed at any time during the display process but their character codes are only inserted into the RAM 23 when the CPU receives an end-of-scan signal from the scan control circuit 26. The CPU 22 energizes each of its output ports in sequence and detects when an input port is energized indicating a key has been depressed (49). The output ports and input ports states the uniquely define which key has been depressed and these states are stored in a key address register KAR and also converted into a character code (CC) for example a binary number, uniquely representating the location of the key 21 that is being depressed (50). The CC is then stored in the address in the RAM 23 specified by the contents of the FAR ie the next empty address after a sequence of characters or blanks (51). The contents of the FAR are then set equal to FAR +1 as explained before (43) so that when the O/P port consideration sequence is started again the next new character is put into an adjacent position in the RAM 23. A pointer register, containing a 1 when set and a 0 when re-set, is then set (52).

The pointer register when set indicates a key was depressed on the preceding scan. To establish whether the same key is depressed on succeeding scans the CPU 22 compares the I/P and O/O port states identifying the key pressed on the present scan (56) with those in the KAR (57). If they are the same the CPU takes no further action and awaits the end of the next scan. If they are different the new character is placed in the RAM 23 (50, 51). The pointer register is only re-set when no key is found depressed at the end of a display scan (59).

This sub-routine ensures that each key depression, which is an event longer in time than several display scans, causes one and only one character to be placed in the RAM 23. Pressing the same key twice in rapid succession is covered by the sub-routine. However fast they are pressed the CPU will find no key depressed (49) at the end of at least one scan between pressings and so re-sets the pointer register (59). The second depression is then treated as a new character and correctly inserted in the RAM 23 (50, 51).

It is emphasized once more that the flow chart shown in FIG. 3 is a very much simplified version of the actual flow chart from which the program instructions contained in the ROM 24 would be derived. However those skilled in the art of programming central processor units such as 22 will now appreciate how the program might be written so that the required moving message display is obtained.

Many modifications and variations of the above embodiments will now suggest themselves to ones skilled in the art for example the CPU 22 might be programmed so that the operation of a reverse switch causes the characters in the RAM 23 to be read to the display in reverse order such that the display appears to move back from left to right. Again a correction facility for correcting ie overwriting the CC in a particular RAM address might be provided.

What I claim is:

1. A display device including a regular array of light souces, scan control means connected to scan the light sources by sequentially priming the columns of said light souces, a first memory circuit for storing appropriate sets of signals for displaying specified dot columns forming parts of predetermined characters, a second memory circuit for storing character signals representing characters in a sequence corresponding to their receipt at an input of the display device, and a computer programmed to select signals from the second memory circuit in the sequence in which they are stored, to derive the addresses in the first memory circuit from the selected signals of dot column signals specifying columns to be displayed of the characters represented by the selected signals, and to apply the dot column signals to the display in synchronism with the operations of said scan control means in such a way that the displayed dot column signals are shifted by one column in the array on each successive scan of the array.

2. The display of claim 1 wherein said array of light sources is a gas discharge display having an array of cavities, said scan control means being operative to transfer the gas discharge down said gas discharge display at a predetermined rate.

* * * * *